United States Patent Office 3,345,426
Patented Oct. 3, 1967

3,345,426
PREPARATION OF TETRAALKYL BENZENE
Arthur W. Langer, Jr., Watchung, N.J., assignor to Esso Research and Engineering Company, a corporation of Delaware
No Drawing. Filed Dec. 4, 1964, Ser. No. 416,152
8 Claims. (Cl. 260—671)

ABSTRACT OF THE DISCLOSURE

A predominantly m-xylene feed stream is alkylated with an olefin under critical reaction conditions, in two stages, to selectively produce 1,2,4,5-tetraalkyl benzene. The product is useful in preparing pyromellitic dianhydride, the latter compound finding use as lubricant, plasticizer, surface coating, etc.

---

This invention relates to the selective preparation of 1,2,4,5-tetraalkyl benzene. More particularly, this invention relates to the alkylation of selected xylene feedstocks under conditions suitable for the selective preparation of said tetraalkyl benzene product. In a preferred embodiment, this invention relates to the selective preparation of 1,5-dimethyl, 2,4-diisopropyl benzene by the alkylation of certain xylene feedstocks with propylene.

Pyromellitic dianhydride is an interesting compound as a raw material for making high temperature lubricants, plastics, plasticizers, surface coatings, etc. In one well known method for preparing pyromellitic dianhydride, durene (1,2,4,5-tetramethyl benzene) is subjected to severe oxidation to produce the desired dianhydride. This process has been found incapable of producing pyromellitic dianhydride at an attractive cost due to the expense of obtaining the durene feed. A clear need, therefore, exists for the production of a low cost feedstock which is capable of being converted to the desired pyromellitic dianhydride product.

It is therefore an object of this invention to provide a process for preparing a low cost feedstock for the preparation of pyromellitic dianhydride.

It is another object of this invention to selectively produce 1,2,4,5-tetraalkyl benzene by the alkylation of a xylene feed.

It has now been discovered that the alkylation of a meta-xylene rich feed stream with certain lower olefins in the presence of a strong acid or Friedel-Crafts catalyst and under carefully controlled reaction conditions will result in the selective production of the desired 1,2,4,5-tetraalkyl benzene product.

The aromatic feed employed in the process of this invention is a meta-xylene rich stream. While it is possible to employ a xylene feed comprising ortho, para, and meta-xylene, it is preferable to utilize the xylene feed recovered from a process in which the ortho-xylene has been extracted. Thus, in a preferred embodiment this invention contemplates the utilization of xylene feed streams comprising 80 to 100 wt. percent meta-xylene, 0 to 20 wt. percent para-xylene, and only minor amounts of components such as ortho-xylene, ethylbenzene, etc. While it is possible to employ xylene streams containing even larger amounts of para-xylene such feedstocks are not preferred since they reduce the selectivity of the process for producing the desired tetraalkyl benzene structure. While the xylene stream recovered after the removal of ortho-xylene may ordinarily be employed in the process without further treating, it is important that this stream as well as the reaction environment be free of water since its presence is believed to promote isomerization. In a preferred embodiment the xylene stream may be dried, for example by passing the stream over sodium, alumina, molecular sieves or by any other conventional technique which will occur to those skilled in the art.

The alkylating agents which may be employed in the reaction of this invention are critical since only certain materials will, when reacted with xylene, give the proper combination of steric and electronic directive forces needed to result in the selective production of 1,2,4,5-tetraalkyl benzene. Thus, the alkylation process of this invention contemplates the utilization of propylene, butene-1, butene-2, or mixtures of the above-mentioned compounds as alkylating agents. The corresponding alcohols or chlorides may also be employed but result in no advantage and merely serve to increase the cost of the process. Other alkylating agents, such as ethylene, ethyl chloride, methyl chloride, etc. are not useful in the process of this invention because they result in a less selective production of the desired tetraalkyl benzene structure. The preferred alkylating agent for utilization in this invention is propylene. As in the case of the xylene feedstock, the alkylating agent fed to the reaction should be free of a significant amount of water and may be dried by conventional techniques to achieve this result.

A critical feature of this invention is the relative amount of xylene and alkylating agent present in the reaction system. While the reaction may be carried out utilizing stoichiometric amounts of reactants, i.e., 2 moles of alkylating agent per mole of xylene, so as to produce the dialkylated derivative of xylene, such a procedure is not preferred since it slows down the rate of reaction. A slow reaction rate must be avoided since the reaction product is capable of isomerizing under the conditions of reaction, thereby resulting in the production of undesired tetraalkyl benzene isomers. Thus, this invention contemplates the utilization of an excess of the alkylating agent. Suitable reactant ratios are in the range of 3 to 20, preferably 4 to 10, moles of alkylating agent per mole of xylene in the system. In one preferred embodiment the reaction is carried out in a system which is fully saturated with the alkylating agent under the conditions of reaction.

The alkylation reaction of this invention is carried out in the presence of any acid-type alkylation catalyst such as the strong acid or Friedel-Crafts type alkylation catalysts which are known to be effective for the alkylation of aromatic compounds. Typical examples of such catalysts are $AlCl_3$, $BF_3$, $HF$, $H_2SO_4$, $SnCl_4$, $TiCl_4$, $ZnCl_2$, etc. $AlCl_3$ has been found to be a very effective catalyst for the purposes of this invention and is a preferred catalyst for selectively obtaining the desired tetraalkyl benzene isomer. The catalyst should be essentially anhydrous. The concentration of the catalyst in the reaction system is of critical importance since the utilization of excess catalyst enhances the isomerization of 1,2,4,5-tetraalkyl benzene to undesired isomers. Thus, the catalyst concentration must be maintained in a range which is effective for carrying out the alkylation reaction but ineffective for the purpose of enhancing the tendency of the reaction product to isomerize. A suitable concentration of catalyst for this reaction is in the range of 0.001 to 10 grams of catalyst per liter of xylene and preferably 0.01 to 1.0 gram of catalyst per liter of xylene. The above catalyst concentrations correspond roughly to 0.0001 wt. percent to 1.0 wt. percent of catalysts, based on xylene in the reaction system.

It is another essential feature of this invention that the catalyst be dispersed in the xylene feed so as to result in a homogeneous reaction system. Any method which results in the dispersal of the catalyst may be employed. Thus, for example, an efficiently stirred reaction vessel may be employed for the purpose of dispersing a catalyst such as $AlCl_3$. In another method of dispersing the catalyst, the catalyst is mixed with at least a portion of the xylene feed and subjected to ultrasonic treatment. Such a treatment consists of exposing the xylene-AlCl₃ mixture in a suitable vessel to ultrasonic sound until a clear yellow solution is obtained. The duration of the treatment will depend on the equipment, quantity of materials, the sound frequency and intensity. Commercially available ultrasonic equipment has been used successfully at frequencies ranging between 20 and 1500 kilocycles for times between a few seconds and 15 minutes.

The temperature and duration of the reaction are also critical features of this invention. Since the object of this invention is to produce a 1,2,4,5-tetraalkyl benzene isomer, the point of addition of the alkyl radicals on the benzene nucleus is of critical importance. It has been found that when forming the desired isomer from a m-xylene rich feed stream and propylene the reaction takes place in two steps wherein a monoalkylated xylene, 1-isopropyl, 2,4-dimethyl benzene, is formed in a first step and the desired 1,2,4,5-isomer, 2,4-diisopropyl-1,5-dimethyl benzene, is formed in a second stage of the reaction. It has been found that the selective formation of the monoalkylate from which the desired dialkylate may be formed is dependent upon the temperature of reaction. Thus, the utilization of high temperatures in the initial stages of the reaction causes the formation of a smear of monoalkylates rather than the desired 1-isopropyl-2,4-dimethyl monoalkylate. On the other hand, it has been discovered that the utilization of lower temperatures during the formation of the dialkylate from the monoalkylate has a tendency to slow down the rate of reaction thereby increasing the possibility of isomerization to undesired tetraalkyl isomers. This invention therefore contemplates carrying out the reaction in two temperature stages. The first temperature stage which is in the range of 0° to 60° C., preferably 15° to 40° C., is maintained for a time sufficient to convert the xylene feed to the monoalkylate, e.g., 1-isopropyl, 2,4-dimethyl benzene. Suitable reaction times for accomplishing this purpose are in the range of 10 minutes to 2 hours and preferably less than 1 hour. The second stage of the reaction is carried out at a higher temperature than the first stage for example in the range of 40° to 125° C., preferably 50° to 100° C., for a time sufficient to convert the monoalkylate to the desired 2,4-dialkyl, 1,5-dimethyl benzene, e.g., 2,4-diisopropyl-1,5-dimethyl benzene. Suitable reaction times for this second stage of the reaction are in the range of 30 minutes to 3 hours and preferably less than 2 hours.

The process described in this invention is amenable to either batch or continuous operation. In any event, it is important that the reaction be carried out under essentially anhydrous conditions and that the catalyst be in a dispersed form as previously mentioned in this specification. The reaction conditions specified in this application will result in essentially 100% conversion of the xylene feed with a minimum selectivity for the formation of 1,2,4,5-tetraalkyl benzene of 65%. By careful control of these reaction conditions selectivities of 75% to 90% are easily obtainable. In an integrated process for recovering the desired 1,2,4,5-tetraalkyl benzene product the product from the alkylation reaction is fed to a flash drum or other conventional separating means to remove excess alkylating agent as well as any traces of xylene feed and monoalkylate which may be present in the reaction product. These removed products may then be recycled to the alkylation reaction for conversion to the desired tetraalkyl benzene product. The bulk of the reaction product, consisting of tetraalkyl benzene isomers, is then further separated by conventional distillation techniques so as to recover the desired 2,4-dialkyl-1,5-dimethyl benzene product. The desired isomer is easily recovered in purities in excess of 95% since it is the most volatile of the tetraalkyl benzene isomers produced in the alkylation reaction. The recovered 1,2,4,5-tetraalkyl benzene product may then be subjected to further processing such as vapor phase oxidation, e.g., in the presence of vanadium catalysts, or liquid phase oxidation, for example in the presence of nitric acid, to produce high yields of pyromellitic dianhydride.

The invention will be further understood by reference to the following illustrative example: a mixture consisting of 85 ml. of meta-xylene, 15 ml. of para-xylene and 0.07 gram of AlCl₃ was placed in a reaction vessel. The catalyst was dispersed in the xylene feed by ultrasonic treatment for 5 minutes at 960 kilocycles. This ultrasonic treatment resulted in a homogeneous clear yellow solution of xylene and catalyst. A magnetic stirrer was added to the solution to provide gentle stirring and pure propylene gas was continuously bubbled through a straight glass tube inserted half way down into the xylene solution. The temperature of the reaction system was brought to 40° C. and maintained at this temperature until the rate of reaction had slowed down appreciably as indicated by a comparison of the inlet and exit rates of propylene (approximately 60 minutes). A sample of the product was then removed for gas chromatographic analysis. The reaction temperature was then increased to 80° C. while the addition of propylene gas through the xylene solution was continued. The reaction was stopped when a comparison of the propylene inlet and exit rates indicated that appreciable reaction was no longer taking place (approximately 170 minutes). The reaction product was worked up by washing with a 50% solution of sodium hydroxide, adding water and cooling the mixture to 25° C. The hydrocarbon layer was then washed with water and dried over potassium carbonate. This product was then analyzed by gas chromatography.

The reaction product was then distilled in a 15 plate Oldershaw column utilizing a 5:1 reflux ratio and 5 millimeters of pressure. The product was separated into three cuts, the first broiling in the range of 230° to 260° C., a second cut in the range of 260° to 260.5° C. and a bottoms fraction.

The results of the gas chromatographic analysis and distillations are summarized in Table I below wherein the letters (m) and (p) indicate the xylene isomer from which the particular product was derived.

TABLE I

| Products | Weight Percent | | | | |
|---|---|---|---|---|---|
| | Partial Conversion at 40° C. | Total Product at 80° C. | Distillation Cuts | | |
| | | | B-1 | B-2 | B-3 |
| m-Xylene | 18.9 | 0 | 0 | 0 | 0 |
| Trialkyl benzenes: | | | | | |
| 1,3,5 (m) | 5.4 | 0.3 | 5.5 | 0 | 0 |
| 1,2,4 (p) | 3.9 | 0 | 0 | 0 | 0 |
| 1,2,4 (m) | 22.7 | 0 | 0.5 | 0 | 0 |
| 1,2,3 (m) | 2.4 | 0 | 0 | 0 | 0 |
| Tetraalkyl benzenes: | | | | | |
| 1,2,4,5 (m) | 32.3 | 63.4 | 83.1 | 74.7 | 4.1 |
| 1,2,3,5 (m) | 0.4 | 2.0 | 1.7 | 2.5 | 0.5 |
| 1,2,3,4 (p) | 1.0 | 0.9 | 0.7 | 1.1 | 0.2 |
| 1,2,3,5 (m+p) | 4.9 | 16.2 | 4.6 | 14.3 | 23.0 |
| 1,2,4,5 (p) | 2.3 | 3.4 | 1.2 | 3.2 | 5.1 |
| 1,2,3,4 (m) | 5.3 | 7.7 | 0.9 | 4.0 | 23.2 |
| Pentaalkyl benzenes | 0 | 5.8 | 0 | 0 | 42.8 |
| Percent Recovery | 99.5 | 99.7 | 98.2 | 99.8 | 99.9 |

The results clearly indicate the selective nature of the process for the production of 1,2,4,5-tetraalkyl benzene. This 1,2,4,5 product from meta-xylene has been identified as 2,4-diisopropyl, 1,5-dimethyl benzene by gas chromatography and infrared analysis. The selectivity to 1,2,4,5-tetraalkyl benzene was 66.8% based on the feed mixture. However, the selectivity to the desired structure from meta-xylene was 74.6% showing that the meta-xylene is the preferred feedstock. Distillation cut B-1 shows that the desired structure obtained from meta-xylene is the lowest boiling tetraalkyl benzene isomer in the mixture and can be separated readily and obtained in high purity (over 95%).

Results similar to Example 1 may be obtained by employing butene-1 or butene-2 as the alkylating agent and $H_2SO_4$ or $BF_3$ as the alkylation catalyst under the same reaction conditions.

Having thus described the general nature and specific embodiments of the invention the true scope will now be pointed out by the appended claims.

What is claimed is:

1. A process for selectively preparing 2,4-dialkyl-1,5-dimethyl benzene which comprises reacting a xylene feed stream comprising at least 80% meta-xylene with 3 to 20 moles per mole of said xylene feed of an alkylating agent selected from the group consisting of propylene, butene-1 and butene-2 in the presence of about 0.001 to 10 grams of an acidic alkylation catalyst per liter of xylene, said alkylation catalyst being dispersed in said xylene feed so as to form a homogeneous solution, at a first temperature stage in the range of 0° to 60° C. for a time sufficient to form a substantial portion of a monoalkylate of said xylene feed thereafter increasing the reaction temperature to a temperature higher than that employed in said first stage and in the range of 40° to 125° C., maintaining the reaction for a time sufficient to convert essentially all the xylene feed to alkylated xylene products and recovering a reaction product containing a major portion of 2,4-dialkyl-1,5-dimethyl benzene.

2. The process of claim 1 wherein said alkylation catalyst is $AlCl_3$, said first temperature stage is maintained for a period of 10 minutes to 2 hours and said second temperature stage is maintained for a period of 30 minutes to 3 hours.

3. The process of claim 2 where in said catalyst is dispersed in said xylene feed by ultrasonic treatment.

4. A process for selectively preparing 2,4-diisopropyl, 1,5-dimethyl benzene which comprises dispersing an $AlCl_3$ alkylation catalyst in a xylene feed stream comprising at least 80 wt. percent meta-xylene to form a homogeneous solution the $AlCl_3$ being present in amounts of about 0.001 to 10 grams per liter of xylene, reacting said homogeneous solution with 3 to 20 moles per mole of xylene of propylene in a first temperature stage in the range of 0° to 60° C. for a time sufficient to form a substantial portion of an isopropyl monoalkylate of said xylene feed, thereafter increasing the reaction temperature to a temperature higher than that employed in said first stage and in the range of 40° to 125° C. for a time to convert essentially all the xylene feed to alkylated xylene products and recovering a reaction product containing a major portion of 2,4-diisopropyl, 1,5-dimethyl benzene.

5. The process of claim 4 in which the reaction is carried out in an essentially anhydrous environment.

6. The process of claim 4 wherein said first temperature stage is maintained for a period of 10 minutes to 2 hours and said second temperature stage is maintained for a period of 30 minutes to 3 hours.

7. The process of claim 4 wherein said catalyst is dispersed in said xylene by ultrasonic treatment.

8. The process of claim 4 wherein said homogeneous solution of xylene and catalyst is maintained by continuous stirring of the reaction system.

References Cited

UNITED STATES PATENTS 2,740,819　4/1956　Kirkland _____ 260—671

FOREIGN PATENTS 571,085　2/1959　Canada.

DELBERT E. GANTZ, *Primary Examiner.*

C. R. DAVIS, *Assistant Examiner.*